United States Patent
Kammerer

(10) Patent No.: US 11,213,165 B2
(45) Date of Patent: Jan. 4, 2022

(54) RADIATION GRILL

(71) Applicant: Kammerer GmbH, Remchingen (DE)

(72) Inventor: Rolf Kammerer, Remchingen (DE)

(73) Assignee: KAMMERER GMBH, Remchingen (DE)

( * ) Notice: Subject to any disclaimer, the term of this patent is extended or adjusted under 35 U.S.C. 154(b) by 399 days.

(21) Appl. No.: 15/995,102

(22) Filed: May 31, 2018

(65) Prior Publication Data

US 2019/0365150 A1    Dec. 5, 2019

(51) Int. Cl.
| | |
|---|---|
| *A47J 37/06* | (2006.01) |
| *F24C 7/04* | (2021.01) |
| *F24C 15/16* | (2006.01) |
| *A47J 37/04* | (2006.01) |

(52) U.S. Cl.
CPC ......... *A47J 37/0635* (2013.01); *A47J 37/049* (2013.01); *F24C 7/046* (2013.01); *F24C 15/162* (2013.01)

(58) Field of Classification Search
CPC ...... A47J 37/0635; A47J 37/049; F24C 7/046
USPC .......................................................... 219/405
See application file for complete search history.

(56) References Cited

U.S. PATENT DOCUMENTS

| | | | | | |
|---|---|---|---|---|---|
| 2,004,775 | A | * | 6/1935 | Wright | A47J 37/047 99/346 |
| 2,094,084 | A | * | 9/1937 | Henri | A23B 7/0215 426/518 |
| 2,133,639 | A | * | 10/1938 | Smith | F24C 15/162 126/340 |
| 2,593,983 | A | * | 4/1952 | Chalupa | A23N 12/10 99/355 |
| 2,845,254 | A | * | 7/1958 | Howden | B01F 9/08 366/222 |
| 3,617,030 | A | * | 11/1971 | Tironi | A23B 7/0215 366/105 |
| 4,155,294 | A | * | 5/1979 | Langhammer | F24C 15/325 219/389 |
| 5,805,769 | A | * | 9/1998 | Cook | A47J 37/0635 362/281 |
| 6,079,319 | A | * | 6/2000 | Doria | A47J 37/047 99/331 |
| 9,157,640 | B2 | * | 10/2015 | Distaso | F24C 15/006 |
| 2010/0139641 | A1 | * | 6/2010 | Distaso | F24C 15/2007 126/21 R |

(Continued)

FOREIGN PATENT DOCUMENTS

| | | | |
|---|---|---|---|
| DE | 20 2015 106 661 | * | 1/2016 |
| DE | 20 2015 106 661 U1 | | 1/2016 |

*Primary Examiner* — Phuong T Nguyen
*Assistant Examiner* — Yeong Juen Thong
(74) *Attorney, Agent, or Firm* — Hackler Daghighian Martino & Novak

(57) ABSTRACT

A radiation grill includes a housing and radiators which are arranged in the housing. A pullout which, in a position retracted into the housing, closes an opening on a front side of the housing. The pullout carries two glass plates arranged standing, which limit a cooking chamber in the retracted position of the pullout between them. Respectively, at least one of the radiators is arranged outside of the cooking chamber between each of the two glass plates and a side wall of the housing to irradiate grilled food in the cooking chamber. It is provided that movement of the pullout is limited by a stop.

7 Claims, 4 Drawing Sheets

(56) References Cited

U.S. PATENT DOCUMENTS

2012/0097046 A1\* 4/2012 Jones ................... A47J 37/041
99/334

\* cited by examiner

RADIATION GRILL

FIELD OF THE INVENTION

The invention is based on a radiation grill having the features specified in the preamble of claim 1, as it is known, for example, from DE 20 2015 106 661 U1.

BACKGROUND OF THE INVENTION

Such a radiation grill has a housing with an upper side, a lower side and side walls connecting the upper side to the lower side. In one of these side walls is an opening into which a holder for food to be grilled can be inserted, which food is then irradiated in the housing laterally by at least two radiators which are arranged at a lateral distance from each other. Food, such as meat, fish or vegetables, can be cooked very quickly and flavorfully with such a radiation grill.

An object of the present invention is to show a way in which such a radiation grill can be improved.

SUMMARY OF THE INVENTION

This object is achieved by a radiation grill having the features specified in the independent claim. Advantageous refinements of the invention are the subject of dependent claims.

In a radiation grill according to the invention, food is held in a pullout or drawer, with which it can be pushed between the radiators. The finished grilled or roasted food can be easily removed by pulling the pullout out of the housing of the radiation grill. In a radiation grill according to the invention, a stop prevents the pullout from being pulled out too far out of the housing of the radiation grill, thus reducing the risk of accidents.

The pullout is preferably fastened to the housing by means of a telescopic rail guide. In this case, an inner rail is movable in an outer rail, a stop can be provided on the outer rail in a simple manner, namely at the end of the outer rail. The telescopic rail guide may be a ball bearing guide, which advantageously reduces the force required to move the pullout. Basically, partial, full and over extensions are suitable. Full extensions and over extensions are particularly advantageous since with them, the glass plates carried by the pullout can be pulled out their full length from the housing. Grilled food can then be removed particularly easily. Preferably, the glass plates are removable from the pullout for cleaning purposes, for example, by being held in grooves or slots.

An advantageous refinement of the invention provides that the glass plates are each accommodated by a metal frame. If the glass plates are damaged, for example, the glass cracks, the metal frame can prevent shards from coming loose. In particular, even a glass plate with cracks can be used further if the metal frame holds the individual shards of the shattered glass plate together. The metal frame may be, for example, sheet metal strips which are bent around the edge of the glass plates, in other words, thus form a groove in which the glass plate sits.

A further advantageous refinement of the invention provides that the pullout has a channel to catch liquid dripping from grilled food and to remove it from the cooking chamber through an opening at the front side of the pullout. The channel preferably protrudes from the front side of the pullout, so that the front side is not contaminated by liquid. The liquid can be collected by a container which is attached to the front side of the pullout, for example, and is suspended there. Preferably, the front side of the pullout has slots into which hooks of the container can be inserted. The channel may be removably attached to the pullout so that it can be removed for cleaning purposes.

A further advantageous refinement of the invention provides that reflectors are associated with the radiators, which reflectors are curved, in particular concavely curved. In this way, the radiant power of the radiators can be used more efficiently than would be the case with planar-configured reflectors. The reflectors are preferably made of ceramic, for example, of aluminum oxide. If, as is preferred, a plurality of radiators are arranged on each side of the cooking chamber, for example, rod-shaped halogen radiators, a corrugated plate can be arranged as a reflector on each side of the cooking chamber, wherein each wave trough forms a concavely curved reflector for a radiator. Preferably, however, a separate reflector is associated with each radiator, for example, in the form of a shell, in particular a single curved shell. A simple curved shell may, for example, have the shape of a longitudinal half of a cylinder. Separate reflectors made of ceramic can advantageously be arranged adjacent to one another. Advantageously, in comparison to a larger reflector for a plurality of radiators, the risk of cracks through mechanical stresses due to thermal expansion is reduced.

A further advantageous refinement of the invention provides that a fan is arranged in the housing for cooling, for example, under the cooking chamber. Components in the interior of the housing are able to absorb significant radiant power through irradiation. One or more fans can prevent this from leading to excessive temperature rise.

A further advantageous refinement of the invention provides that the two glass plates of the pullout are part of a roasting insert which contains a mixing element. While a conventional radiation grill is only suitable for grilled food which can be clamped between two grid surfaces of a holder, food that is present only in small pieces can also be prepared with such a roasting insert. Small pieces or chunks cannot be clamped by a conventional holder, but can be prepared easily in a roasting insert according to the invention, since they can be irradiated therein through its glass wall or walls, while a mixing element ensures that the radiation exposure is distributed to different pieces or different sides of the pieces. For example, coffee beans can be roasted with a roasting insert according to the invention.

An advantageous refinement of the invention provides that the roasting insert has means for setting the mixing element into rotation. In this case, the mixing element can be set into rotation relative to the housing of the roasting insert, for example, by being configured as a stirring element or a screw. Another possibility is that the roasting insert as a whole, that is, both the mixing element and its housing, are set into rotation, for example, by the roasting insert being rotatably mounted in or on the radiation grill. In this case, mixing elements may be configured as projections or on the inner side of the housing, in particular projections which project inwardly from the peripheral wall of the roasting insert.

The radiation grill preferably contains a drive in order to set the mixing element into rotation, in particular to turn the roasting insert relative to the radiation grill. Such an electric motor can be protected from radiation in the radiation grill by the abovementioned reflectors, for example, between a side wall of the housing and the rear sides of the reflector, which faces away from the radiator with which the reflector is associated.

A further advantageous refinement of the invention provides that the roasting insert has a holder and a drum hinged to the holder, which drum has glass plates as side walls and a peripheral wall connecting the two glass plates. In order to introduce food into the drum or to take it out, at least one of the two glass plates is preferably held detachably by the peripheral wall.

Preferably, a peg protrudes from the center of the glass plates of the roasting insert. Advantageously, the drum can be rotatably mounted with these pegs, for example, in slots of a holder.

BRIEF DESCRIPTION OF THE DRAWINGS

Further details and advantages of the invention will be explained with reference to illustrative embodiments and the accompanying drawings. The same and corresponding components are denoted by coinciding reference numerals. They show.

DETAILED DESCRIPTION OF THE PREFERRED EMBODIMENTS

Figure 1:
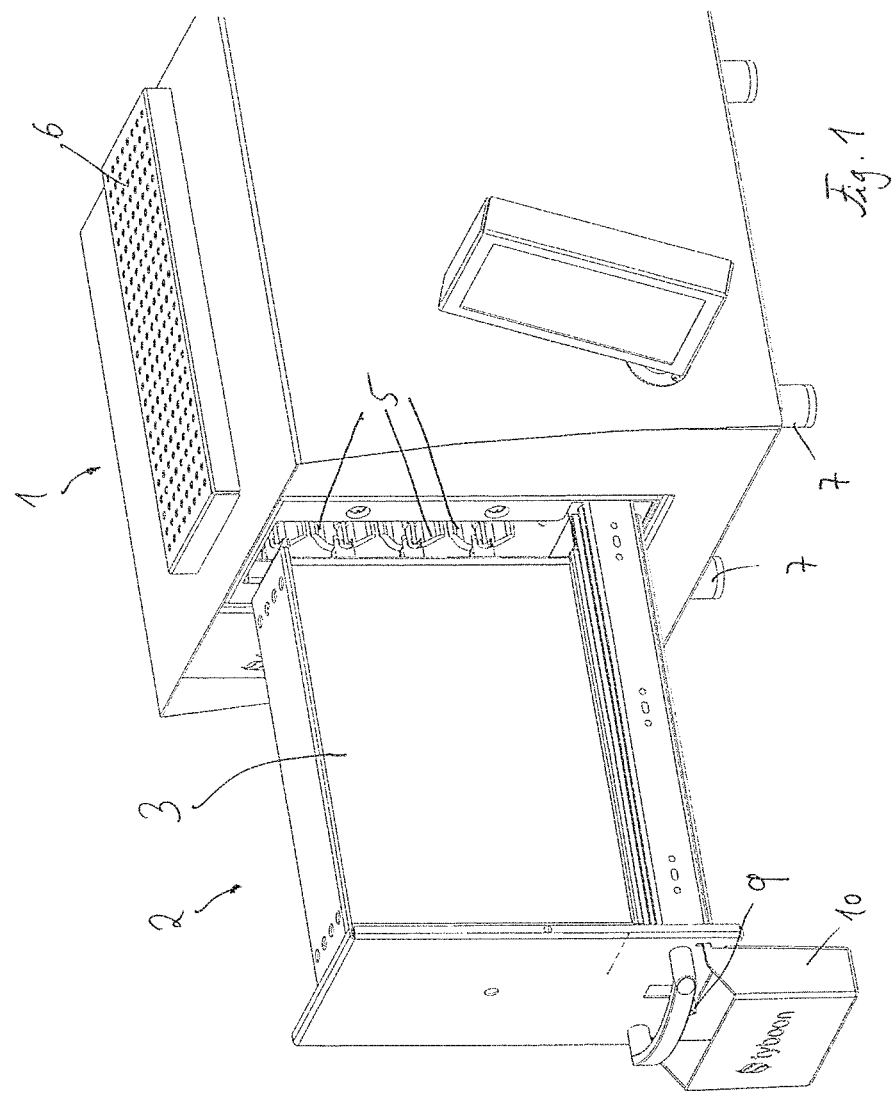
FIG. 1 is a schematic representation of a radiation grill.

The radiation grill shown in FIG. 1 has a housing 1 and a pullout 2, which is shown in its extended position in FIG. 1 and in its retracted position, closes an opening in a front side of the housing 1. The pullout 2 carries two glass plates 3, between which grilled food can be held with a holder, not shown. By sliding the pullout 2 into the housing 1, grilled food held between the glass plates 3 passes between two groups of radiators 4 arranged in the housing 1, which radiators can be seen in particular in FIG. 2.

Figure 2:
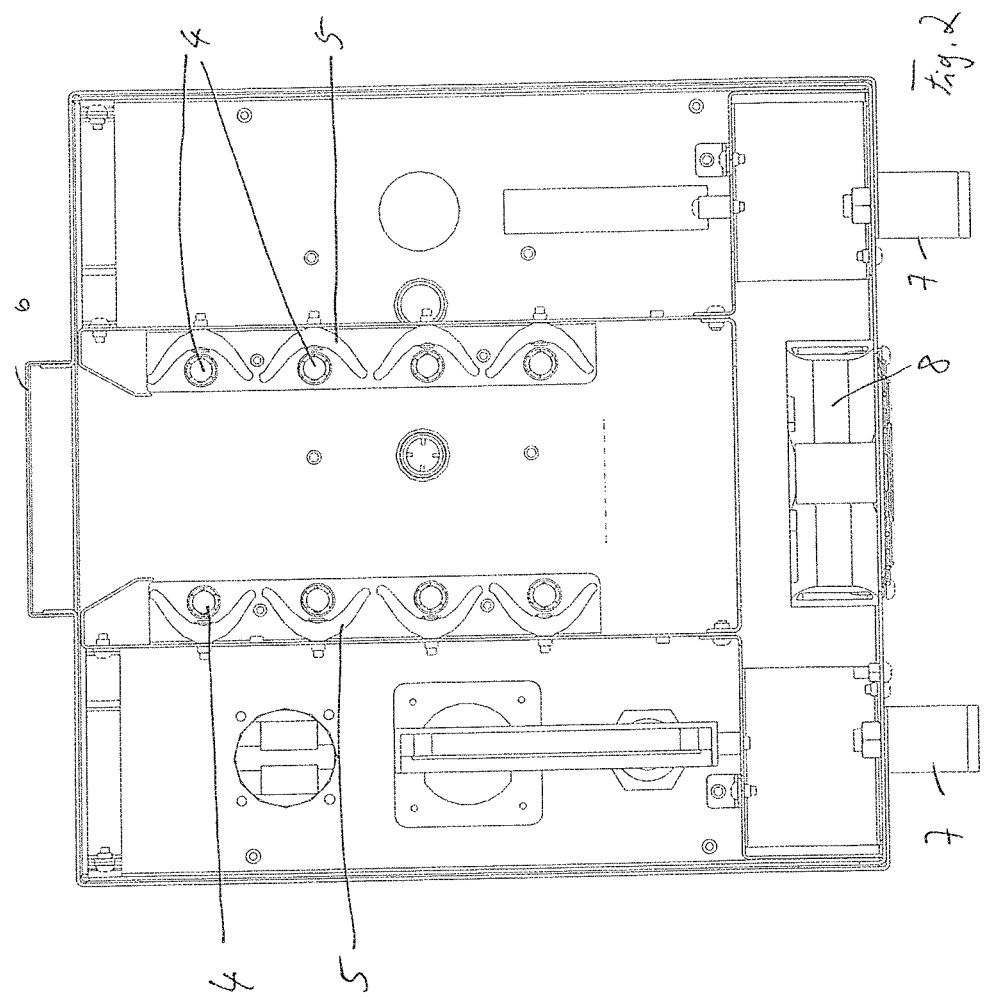
FIG. 2 is a sectional view of FIG. 1.

FIG. 2 shows a sectional view of FIG. 1, whose line of intersection runs perpendicular to the movement direction of the pullout 2 through the housing 1, which carries on its upper side a grid or perforated plate 6 having ventilation openings and has feet 7 on its lower side. The radiator 4 may be, for example, halogen lamps, for example, in the form of rods. Reflectors 5 are associated with the radiators 4, which reflectors are concavely curved. The reflectors 5, which are preferably made of ceramic, for example, of aluminum oxide, improve the utilization of the light generated by the radiators 4. In addition, viewed from the radiators 4, temperature-sensitive components of the radiation grill, for example, control electronics, can be arranged behind the reflectors 5. The reflectors 5 may be configured as individual shells, for example, in the form of channels. The reflectors 5 may be individually attached to an inner wall, for example, by screws and nuts.

A fan 8 or a plurality of fans can be arranged in the housing 1 for cooling. The fan 8 effects a cooling air flow through the cooking chamber, for example, from ventilation openings on the lower side of the housing 1 to the grid or perforated plate 6 on the upper side of the housing 1.

The maximum extension path of the pullout 2 is limited by a stop. The pullout 2 may be fastened to the housing 1 by means of a telescopic rail guide. In this case, ball-bearing guides can be used to reduce the force to move the pullout 2. Suitable telescopic rail guides are known, for example, from EP 1 540 253 B1 and EP 0 952 403 A2. In telescopic rail guides, a stop for limiting the maximum extension path may be configured by an outer rail, for example, a profile made of sheet metal, having at its end a peg or pin, striking against the inner rail. Another possibility is to close off the ends of the outer rail. Then the inner rail can only move into the outer rail up to the closed end, where it then strikes.

Preferably, the pullout 2 is configured as a full extension or an over extension, so that grilled food can be handled easily when removed from the pullout 2. The pullout 2 can preferably be pulled out of the housing 1 so far that the glass plates 3 are located completely outside the housing 1, that is, their rear end in the extension direction is in front of the front wall of the housing 1.

The pullout 2 comprises a channel 9 between the glass plates 3 in order to catch fluid dripping from grilled food and to conduct it out through an opening on the front side of the pullout 2. A collecting container 10 is arranged under one end of the channel 9, which protrudes from the front side of the pullout 2. The collecting container 10 may be suspended on the pullout 2, for example, by means of hooks which engage in slots in the front side of the pullout 2. The channel 9 can preferably be removed from the pullout 2 for cleaning, for example, the channel 9 can lie loosely on a bottom of the pullout. By conducting grease dripping from grilled food out of the cooking chamber, it is possible to counteract the danger that the dripping grease overheats and ignites.

The two glass plates 3 can be accommodated at their edges by a metal frame. As a result, the glass plates 3 can be protected from damage. Preferably, the glass plates 3 can be removed together with their frame from the pullout 2 to facilitate cleaning. For example, the glass plates 3 may be inserted with their respective frame into slots of the pullout 2.

Figure 3:
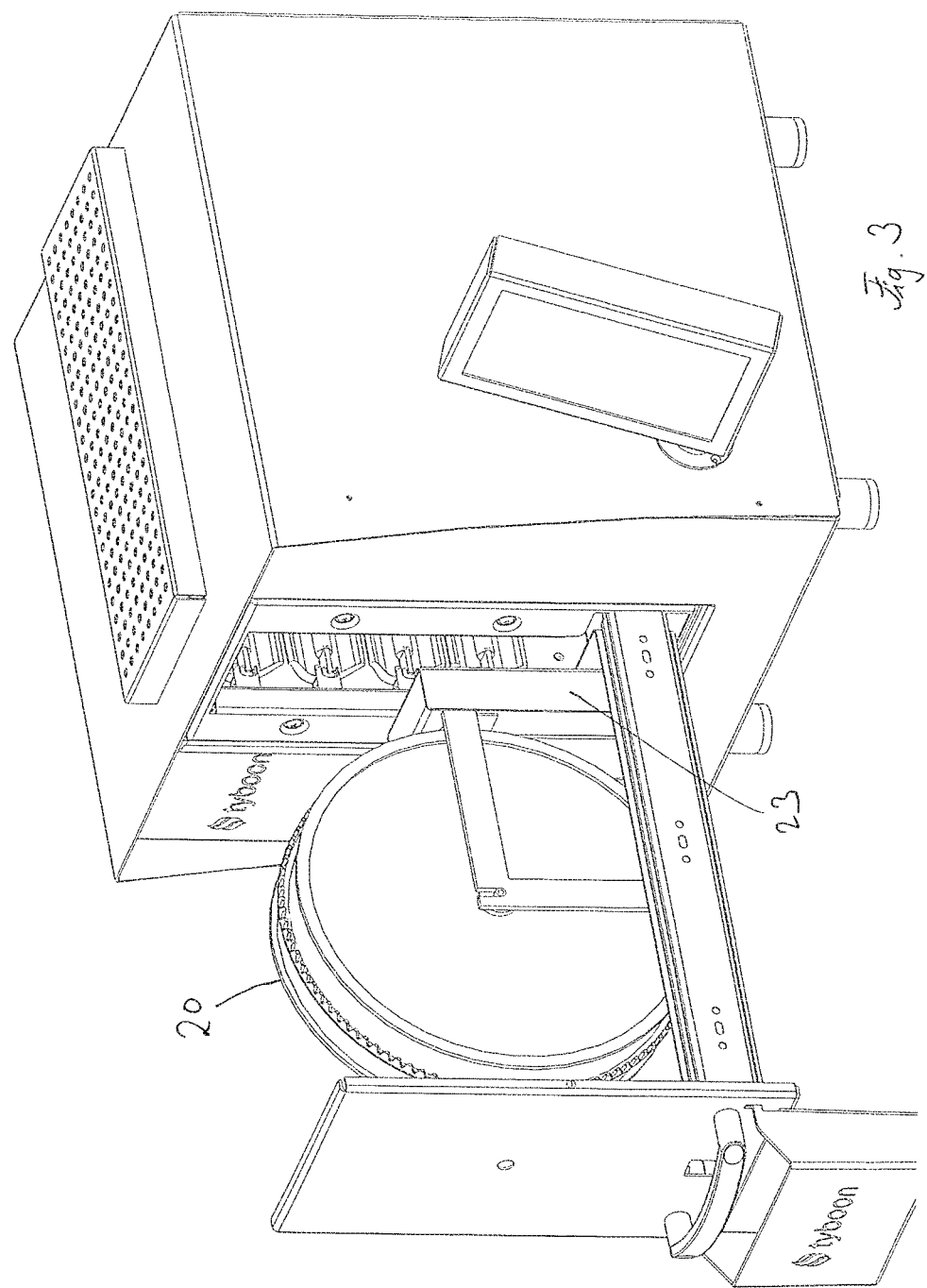
FIG. 3 is a further embodiment of a radiation grill.
Figure 4:
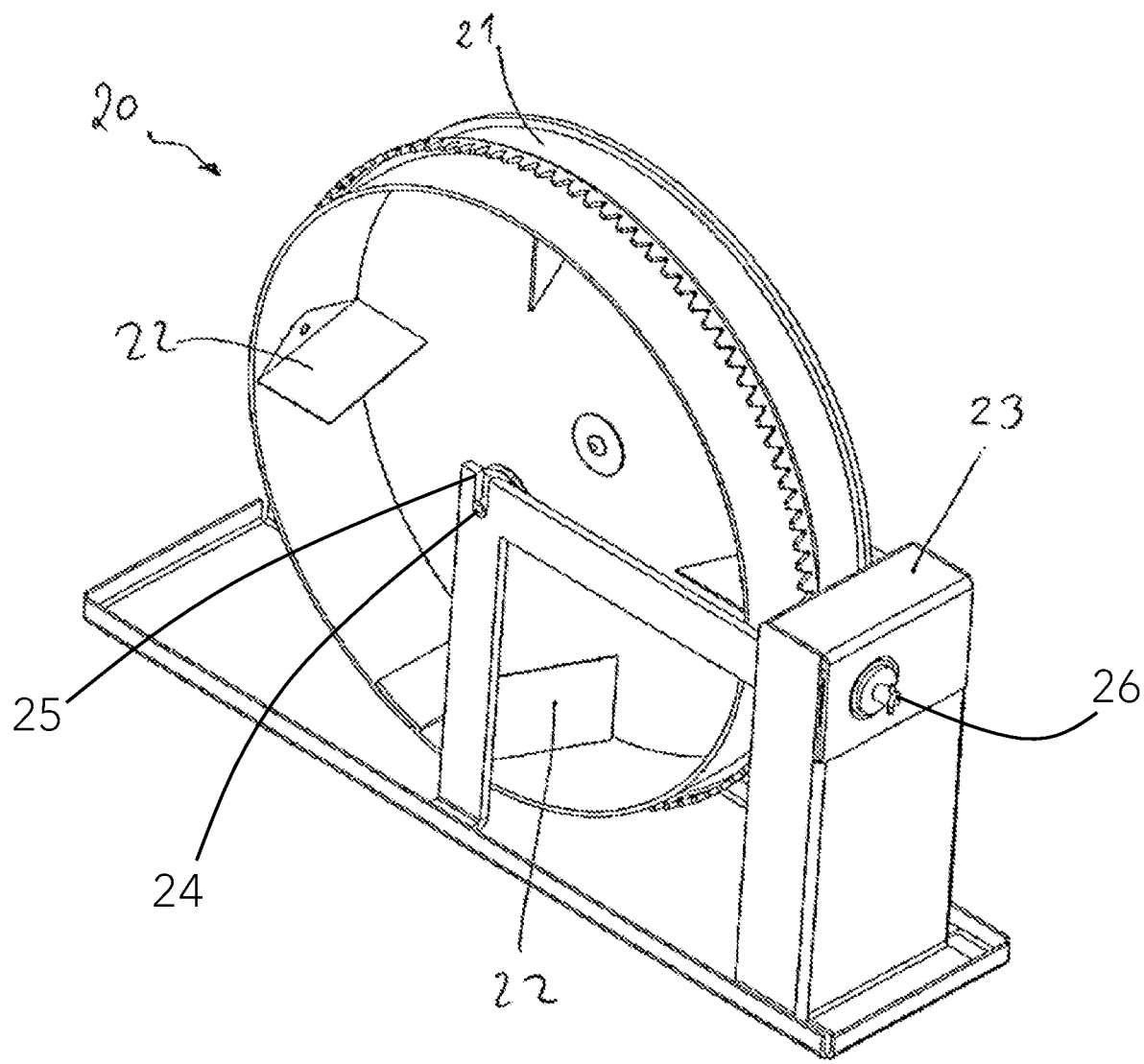
FIG. 4 is a roasting insert of the radiation grill shown in FIG. 3.

FIG. 3 shows a further embodiment of a radiation grill, which differs substantially from the illustrative embodiment of FIGS. 1 and 2 described above only in that the pullout 2 carries a roasting insert 20, which is shown in detail in FIG. 4. Coffee beans, diced vegetables or similar foods of small parts can be roasted in the roasting insert 20. The roasting insert 20 is configured in the embodiment shown as a roasting drum, the side walls of which are formed of glass plates 3 which are connected by a peripheral wall 21. The side walls can be removed from the peripheral wall 21 to fill food into the roasting insert or to remove roasted food from it.

The roasting insert 20 contains mixing elements 22, which preferably emanate from the peripheral wall 21. The roasting insert 20 is rotatably held by a holder 23, which carries the pullout 2, for example, in which lie pegs or an axle 24 in the center of the drum in slots 25 of the holder 23. By turning the roasting insert 20, the mixing elements 21 are also set into rotation relative to the holder 23, so that roasted food mounted in the drum, e.g., coffee beans, is mixed and thus uniformly irradiated from all sides.

In order to set the roasting insert 20 into rotation, this may have a sprocket on its peripheral wall 21. An electric motor which is arranged in the housing of the radiation grill, can thus exert a torque on a sprocket via a toothed wheel.

LIST OF REFERENCE NUMBERS

1 housing
2 pullout
3 glass plate
4 radiator
5 reflector
6 perforated plate
7 foot
8 fan 9 channel
10 collecting container
20 roasting insert
21 peripheral wall
22 mixing element
23 holder
24 axle
25 slots
26 electric motor

What is claimed is:

1. A radiation grill, comprising:
 a housing;
 radiators, which are arranged in the housing, configured to emit light energy;
 a pullout, which, in a position retracted into the housing, closes an opening on a front side of the housing;
 wherein the pullout carries two glass plates arranged r said glass plates limiting between them a cooking chamber in the retracted position of the pullout, wherein the radiators are arranged outside of the cooking chamber between each of the two glass plates and a side wall of the housing to irradiate food in the cooking chamber by the emitted light energy from the radiators; and
 a stop that limits a movement of the pullout;
 wherein the two glass plates are part of a radiant energy roasting insert which contains a plurality of mixing elements;
 including means for setting the mixing element into rotation; and
 wherein the radiant energy roasting insert is a drum that is rotatably mounted by an axle disposed within a slot of a holder that is attached to the pullout, wherein the glass plates form side walls of the drum and the drum has a peripheral wall which is connected to the side walls;
 wherein the plurality of mixing elements are arranged in the drum, where each mixing element emanates from an inside surface of the peripheral wall extending towards the axle;
 wherein reflectors are arranged on the side of the radiator facing away from the cooking chamber, which reflectors are concavely curved;
 wherein a fan is arranged in the housing for cooling.

2. The radiation grill according to claim 1, wherein the pullout is fastened to the housing by means of a telescopic rail guide.

3. The radiation grill according to claim 1, wherein the reflectors are ceramic shells.

4. The radiation grill according to claim 1, wherein the pullout comprises a channel between the two glass plates, said channel leading away from the cooking chamber where liquid dripping from grilled food can flow through an opening on the front side of the pullout.

5. The radiation grill according to claim 4, wherein a collecting container is suspended on the front side of the pullout to receive liquid from the channel.

6. The radiation grill according to claim 1, wherein the glass plates are each held by a metal frame.

7. The radiation grill according to claim 1, wherein the peripheral wall has a sprocket on its outer side, via which sprocket the drum is configured to be set into rotation.

* * * * *